United States Patent [19]

Tsai

[11] Patent Number: 4,939,432
[45] Date of Patent: Jul. 3, 1990

[54] AC/DC AUTOMATIC CHANGEOVER AND AUTOMATIC CHARGE DEVICE

[76] Inventor: Shian-Fun Tsai, 2nd F., No. 20, Alley 7, La. 23, Nanking E.Rd. Sec. 5, Taipei, Taiwan

[21] Appl. No.: 206,425

[22] Filed: Jun. 14, 1988

[51] Int. Cl.⁵ ............................................. H02K 33/12
[52] U.S. Cl. .................................... 318/124; 318/130; 310/29; 307/66
[58] Field of Search ................. 307/64, 66, 85, 86, 307/87; 320/27, 28, 29, 30, 48, 2, 11; 363/15, 16, 22, 24, 34, 109, 137; 318/124, 130; 310/29

[56] References Cited

U.S. PATENT DOCUMENTS 4,636,695  1/1987  Tsai ............................ 318/130 X Primary Examiner—William M. Shoop, Jr.
Assistant Examiner—Paul Ip
Attorney, Agent, or Firm—Asian Pacific Int'l Patent & Trademark Office

[57] ABSTRACT

The AC/DC changeover device automatically changes from AC to DC current by setting a TRIAC on or off, to supply DC from a battery in the absence of AC, for powering an air pump for an aquarium.

6 Claims, 2 Drawing Sheets

FIG·1

AC/DC AUTOMATIC CHANGEOVER AND AUTOMATIC CHARGE DEVICE

BACKGROUND OF THE INVENTION

Air or water pumps generally installed on an aquarium are most likely using the city power as an energy source. If the city power fails for any reason, these pumps cease to work and thereby discontinue the supply of water or air to the aquarium. With such abrupt discontinuation of the supply of air or water, the aquatic animals may luckily enough may stay alive for 1 or 2 more hours if the city power was to resume supply at this time. But if the failure of power lasts longer than this the aquatic animals lives are threatened once the oxygen contained in the water is exhausted.

Bearing in mind the shortcoming specified above, the inventor has worked out, as a result of extensive research and experiment, an AC/DC automatic changeover and automatic charge device. This device is the parallel to the invention AC/DC Electro-Magnetic Device for Aeration Pump in Fish Globe or the like, of USA, Patent Right No. 4,636,695. The device of this invention is able to operate under the normal condition of an AC power supply, and in the meantime maintain automatic charge to a battery. If the AC power supply fails it automatically changes over to a DC power supply so as to maintain the function of the pumps without interruption.

SUMMARY OF THE INVENTION

The invention is of an air or water pumping device, used in particular on an aquarium, with the capability of the changeover of the power supply source from AC to DC. During the time of normal power supply it operates on AC power. Once the AC supply fails, it automatically changes over to operate on a DC supply from a battery which is continuously being charged during the time of normal operation. Thus, it keeps uninterrupted supply of air or water to the aquarium by means of a DC motorless pump.

DETAILED DESCRIPTION

Figure 1:
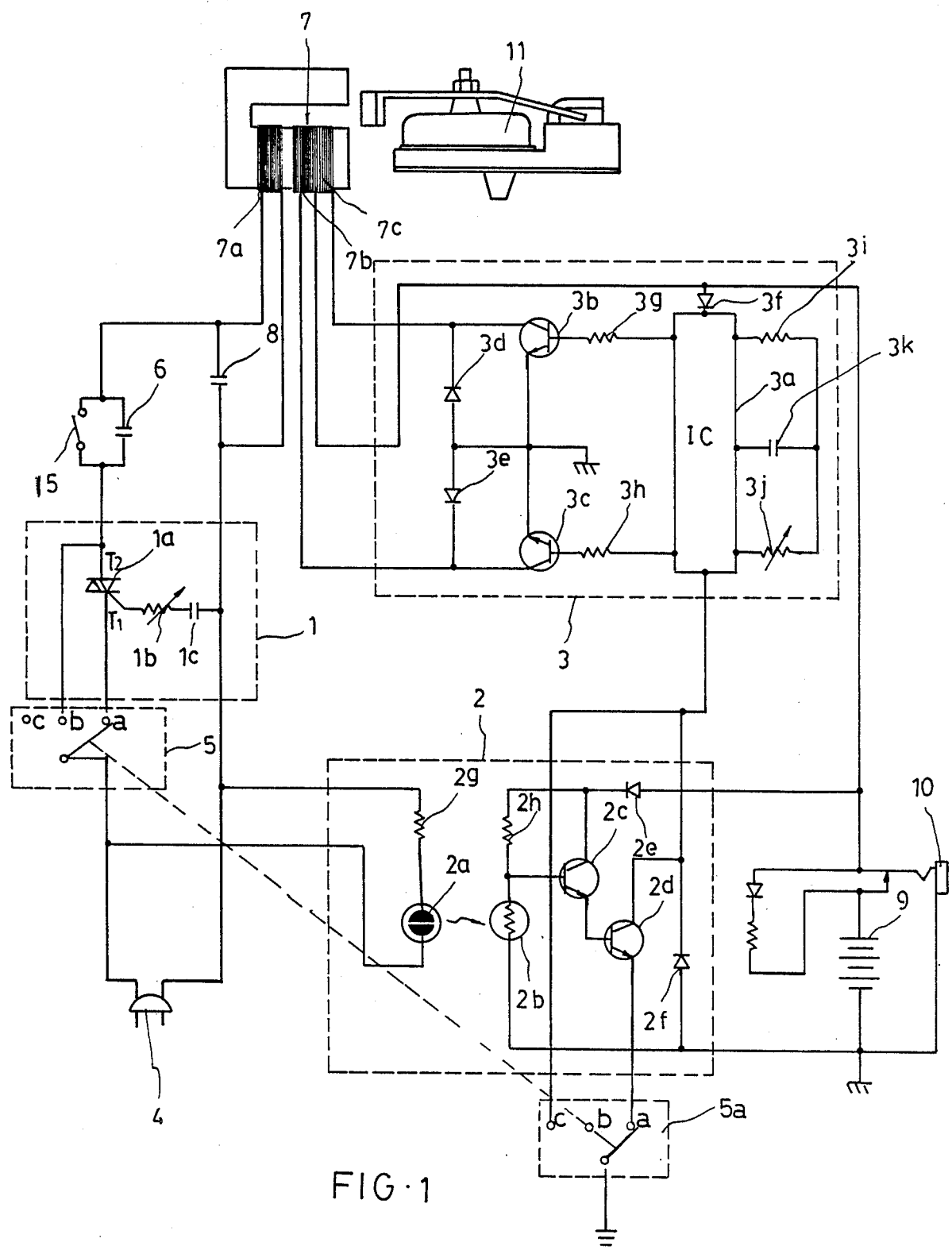
FIG. 1, Embodiment 1—Circuitry of the AC/DC automatic changeover and automatic electrical charge device.
Figure 2:
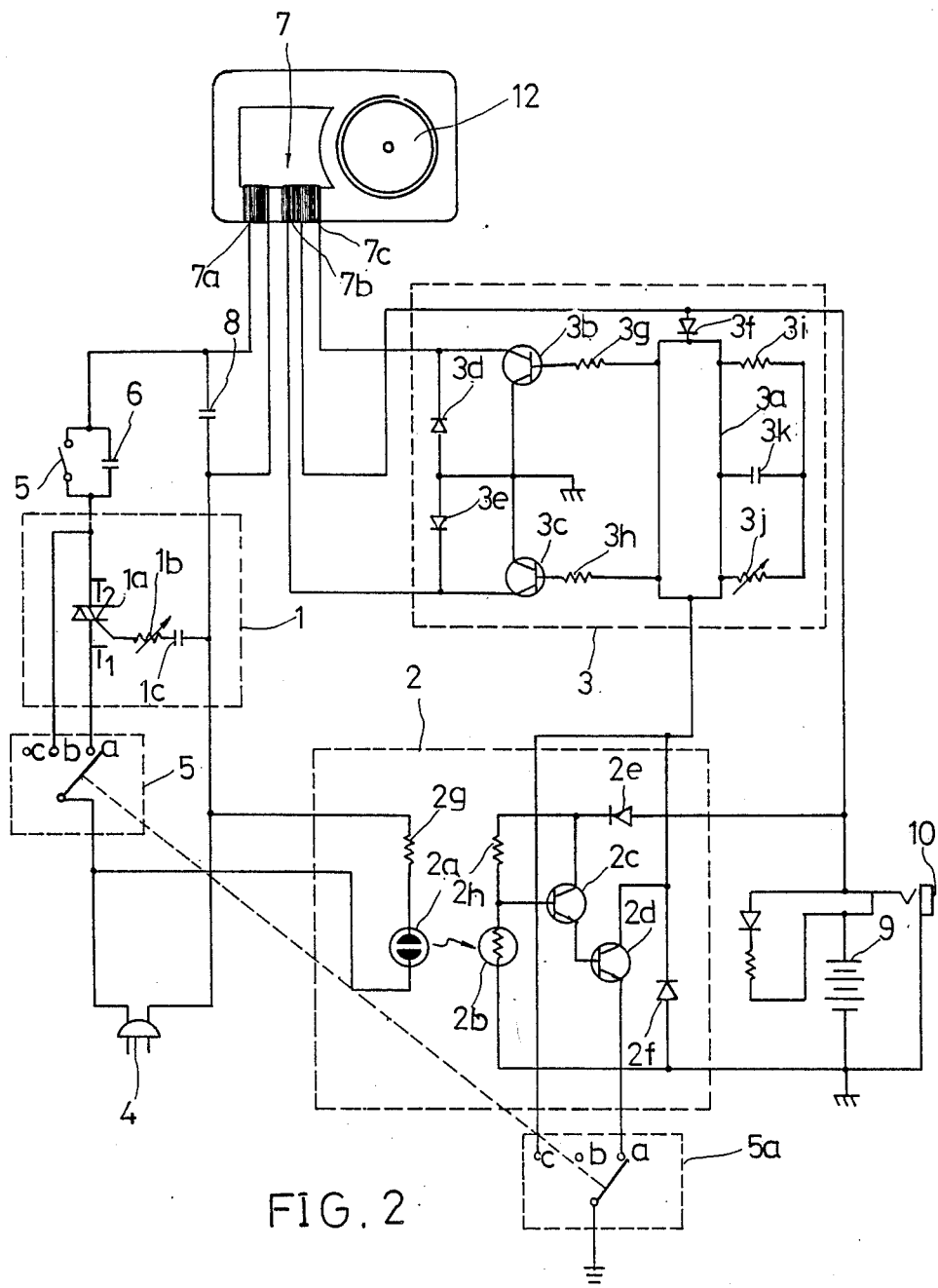
FIG. 2, Embodiment 2—Circuitry of the AC/DC automatic changeover and automatic electrical charge.

As specified in FIG. 1, the main components of the invention consist of an AC non-contact switch circuit (1), an optical-electron DC non-contact switch circuit (2), a DC motorless air pump circuit (3)—which has been granted the Patent Right, and an AC/DC changeover switch (5). The AC non-contact switch circuit (1) consists of TRIAC (1a), a resistor (1b) combined with a condenser (1c) into a single phase conductivity circuit. The optical-electron DC non-contact switch circuit (2) is made up of a neon light (2a), light-sensitive resistor (2b), transistors (2c) (2d), diodes (2e) (2f) and resistors (2g) (2h). The DC motorless air pump circuit (3) consists of the oscillator IC (3a), transistors (3b) (3c), diodes (3d), (3e) (3f), resistors (3g) (3h) (3i), a variable resistor (3j), and a condenser (3k). The fourth component of the invention are the two circuits of the AC/DC changeover switch (5) (5a), of which each circuit consist of a movable switch with three positions.

When the AC changeover switch (5) is set at the position a, the normal mode of operation, 110 V of AC power, is running from the power socket (4) through the AC non-contact switch circuit (1) (The bias resistance of $T_1$ and g of TRIAC actuates the function); thereby energizing the switch (15), the condenser (6), and the first coil (7a) of the magnetic coil (7). This generates a magnetic force in the first coil (7a) and thereby sets in action the air pump (11) or the electrical-induction water pump (12). When the switch (15) is closed AC power is supplied directly to the first coil (7a). When the switch (15) is open condenser (6) limits the magnetic field produced by the first coil (7a) which adjusts the speed of air flow. The resistor (1b) sets the direction that the AC current flows through the non-contact switch circuit (1). This means that only when the power plug (4) is in contact with live AC power, can AC current non-contact switch circuit (1) let the AC pass through. If the resistor (1b) is set in the opposite direction there is no AC current in the circuit (1). The AC power along with with the function of the resistor (2g) turns the neon light (2a) on. With it on, the intensity of the resistance of the light-sensitive resistor (1b) is greatly reduced, therefore the transistors (2c) (2d) are in the cut-off condition because their base is without bias resistance. Accordingly, the DC motorless pump circuit (3) stands still. For saving the energy at this stage there are the mid-taps in the secondary coils (7b) (7c) which results in a voltage being induced in the secondary coils by the first coil (7a); this generate 8 V AC. This 8 V AC is rectified by the antielectric power protected diodes (3d) (3a), and results in 6 V DC available for charging the the battery (9).

When the AC supply fails, the AC non-contact switch circuit (1) is immediately shut off. Time then the $T_1$ and G of TRIAC is automatically off. This automatic function is designed for the purpose of precluding from the loss of the current power as result of the excessive outer negative load. At this stage, the neon light is turned off, this intensifies the light-sensitive resistance of the resistor (2b). The resistor (2h) provides the bias resistance that electrifies the transistors (2c) and (2d) and thereby grounds the oscillator IC (3a). At this juncture the DC power which is supplied by either the 6 V battery (9) or the DC socket (10), is led to the oscilator IC (3a) through the diode (3f) acting as a protective agent for the IC. Consequently, the motorless DC pump circuit (3) starts to generate the magnetic force of a magnetic coils (7b) (7c) in the coil (7) and the normal operation in the air pump (11) or the electrical-induction water pump (12) continues. At this time, the first coil (7a) has a 110 V AC voltage induced in it by the magnetic field of the secondary coils (7b) (7c). With the merit of the condenser (8) and blockage by a shut-off TRIAC (1a) no power goes astry or is leaked. The neon light (2a) stays unlit and ensures to maintain a steady supply of DC power. Adjusted the resistor (1b).

When the AC/DC changeover switch (5a) is set at the position b, the transistor (2d) is on, and in the meantime, AC current will go through the changeover switch (5) directly to $T_2$ of AC switch (1a), through the consenser (6), and finally to the coil (7a). Thus it generates a magnetic force good enough to drive air pump (11) or the electrical-induction water pump (12). If at this time, the AC supply is discontinued the operation of the pumps are stopped. The design above means that only AC power is used at this stage. The pump operation is discontinued once the AC power fails.

When the AC/DC changeover switch (5a) is set at the position c, it cuts off the AC supply, and in the meantime enables IC (3a) to become grounded, this actuates the DC motorless air pump circuit. This function drawa the DC power directly from the battery (9).

In the light of the above, it can readily be seen that the invention is a completely new design with a better operating efficiency than any other design in current use. This is a perfectly accomplished invention as it meets the new requirements of a better model of its kind.

What is claimed is:

1. An AC/DC auto-switching device for controlling an air pump for use in an aquarium and the like, and for driving said air pump substantially continuously with DC power immediately on AC per disruption, said device comprising:

an electromagnet including a first loading coil and a second loading coil;

AC power-connecting means for connecting said first loading coil to a source of AC power for the provision of an electromagnetic force to operate said air pump;

an optical-electron DC non-contact switch circuit for detecting the presence of AC power;

DC power-connecting means for electrically connecting said second loading coil of said electromagnet to a battery for enabling said electromagnet to operate substantially continuously immediately upon occurrence of AC power disruption said air pump;

oscillating signal generating means operatively connected to said DC power-connecting means, for generating an oscillating signal, at said second loading coil; and an AC/DC switching means including a two-interlock three-position selector switch, one of said two-interlock being connected to an input end of said AC power-connecting means and, the other of said two-interlock switch being capable of controlling said optical-electron DC non-contact switch circuit.

2. The device according to claim 1, wherein said optical-electron DC non-contact switch circuit is connected to the input end of said AC power-connecting means by way of a neon light having a light-sensitive resistor particularly to detect the light generated from said neon light so as to check normal supply of AC power.

3. The device according to claim 1, wherein said oscillating signal generating means includes a variable resistor for adjusting the oscillating frequency.

4. The device according to claim 1, wherein said DC power-connecting means includes a jack connectable to a source of DC power.

5. The device according to claim 1, and further including a regulating circuit includes a switch and at least one capacitor for controlling the amplitude of voltage supplied to said first loading coil by way of said AC power-connecting means.

6. The device according to claim 1, wherein said second loading coil includes a center tap directly connected to the respective positive terminal of said battery through said DC power-connecting means; whereby each time AC power is supplied to said second loading coil through said AC power-connecting means, said second loading coil is induced to generate at least about 8 volt AC power for charging said battery by way of the rectification of a diode.

* * * * *